March 17, 1964     K. EISENBURGER ETAL     3,125,668
MULTIPLE SPOT WELDING MACHINE
Filed June 12, 1962                           2 Sheets-Sheet 1
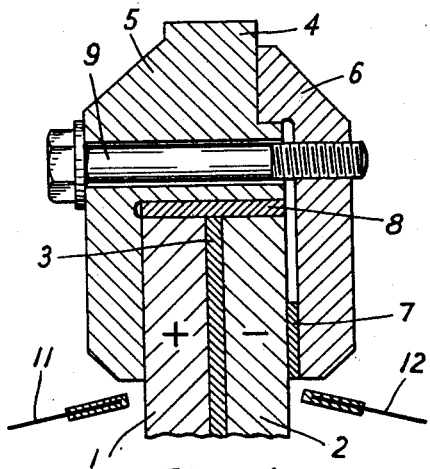
Fig. 1
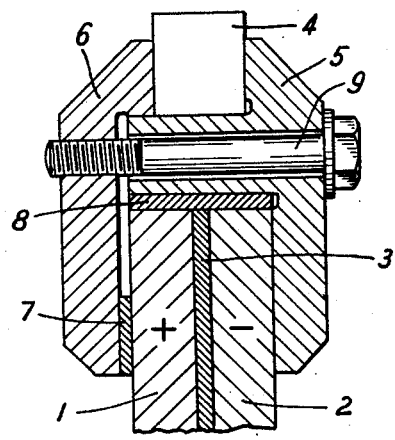
Fig. 2
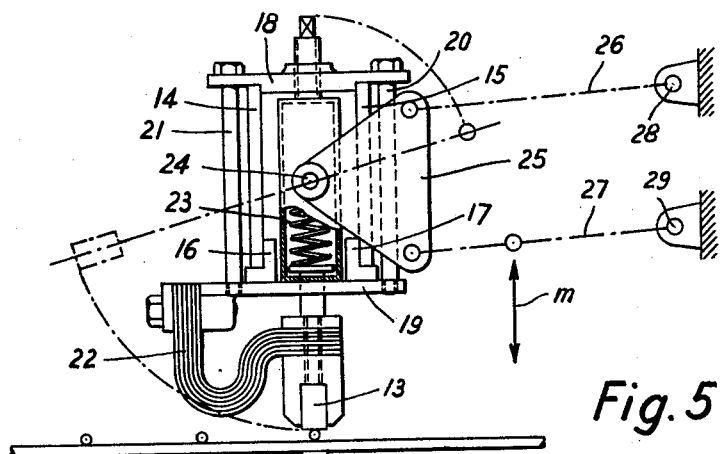
Fig. 5
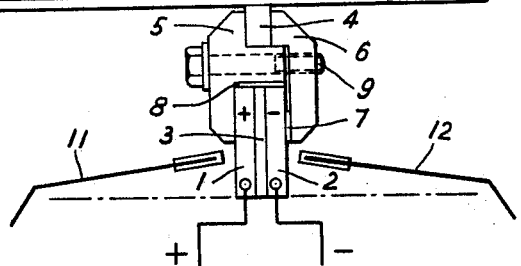
INVENTORS:
Kuno Eisenburger
Josef Pitter
BY Michael J. Striker
ATTORNEY

United States Patent Office 3,125,668
Patented Mar. 17, 1964

3,125,668
MULTIPLE SPOT WELDING MACHINE
Kuno Eisenburger, Wels-Thalheim, Gut Hummelberg, and Josef Ritter, Graz-Kroisbach, Austria, assignors to EVG Entwicklungs- u. Verwertungs-Gesellschaft m.b.H., Graz, Styria, Austria
Filed June 12, 1962, Ser. No. 201,861
12 Claims. (Cl. 219—87)

Multiple spot welding machines which do not constitute single purpose machines constantly used for one and the same welding program, must comprise adjustable electrodes to permit of an adjustment of the spacing of the welding spots as required. The spacing of the welding spots must be changed, e.g., in grid welding machines when used for making grids of different mesh size.

In known multiple spot welding machines provided with adjustable electrodes, the latter are connected to the secondary winding of the welding transformer by flexible cables so that the electrodes can be displaced within predetermined limits and can be fixed in the desired welding positions by suitable means. Other known multiple spot welding machines comprise a plurality of closely spaced stationary electrodes, certain of which may be selected as required and may be connected by means of flexible cables to the secondary winding of the welding transformer. Instead of replugging cables to select the electrodes, this may be effected by means of rotary or cam slot controls.

In practice, all these types of multiple spot welding machines exhibit disadvantages because either the welding transformer secondary circuits, which carry a very high current, are relatively long so that high power losses result, or the current flows through a plurality of contact surfaces (rotary or cam slot controls) which have considerable contact resistances resulting also in losses. In all cases, the heat which is due to these losses must be dissipated.

In order to avoid these disadvantages, it has already been proposed to connect the secondary winding of the welding transformer to two busbars extending in the direction of the series of welding spots which busbars have confronting contact surfaces and define a gap between them, and to clamp the welding electrodes in selectable positions in the gap between the two busbars whereas an insulating layer is disposed between on one side of each electrode and one of the contact surfaces while the electrode is in conductive contact with the respective other contact surface. With this design, the fact that all electrodes are jointly clamped between the two busbars renders an adjustment of individual electrodes relatively complicated. Besides, foreign matter may enter the free spaces of the gap between the busbars and may result in short circuits.

For this reason it is an object of the invention to provide a multiple spot welding machine, in which all above-mentioned disadvantages of the prior machines are avoided and the electrodes are adjustable with simple means so that the spacing of the welding spots of a series thereof can be varied within wide limits.

A multiple spot welding machine embodying the invention and comprising adjustable electrodes comprises two busbars which extend in the direction of the series of welding spots and is essentially characterized in that the gap between the confronting side faces of the busbars is filled by an insulating interlayer and each welding electrode is adapted to be clamped fast to the busbars with the aid of a pair of clamping jaws, one jaw of which is in conductive contact with one busbar whereas the other jaw is in insulated engagement with the other busbar. The two clamping jaws associated with each welding electrode embrace the two busbars preferably like a vice. The welding electrode may be integral with one of the two jaws of the associated pair of clamping jaws or may consist of a separate part, which is clamped between the two jaws. Clamping screws which force the jaws together are suitably used for clamping the jaws and the electrode fast at the desired point on the busbars.

The two busbars, which are connected to the secondary winding of the transformer, may have a relatively large cross-section so that the losses in these bars are small. Forcing the clamping jaws against the busbars ensures a snug contact between the bare side face of one clamping jaw and the confronting contact surface of the busbar so that the contact resistance is small. This clamping jaw causes current to flow from the respective busbar to the welding spot and from there to the passive complementary electrode (current bridge) whereas the other clamping jaw does not conduct current but is insulated and serves only for clamping. As has been mentioned, the welding electrode is either integral with one jaw or in snug contact with the clamping jaws between the top ends thereof with a small contact resistance so that significant losses between the clamping jaws and the electrodes do not occur.

Each of these electrode units can be individually adjusted and can be clamped to any desired point on the busbar so that the spacing of the welding spots can be selected as desired. The two busbars constitute a guide for the adjusting movement of the electrode units. The electrode units may be arranged in such a manner that the electrodes are either successively connected to the positive and negative bars or they may have any other polarity pattern. In any case, however, the number of positive electrodes should be approximately equal to the number of the negative electrodes.

Opposite to each welding electrode, a passive complementary electrode is provided, which is preferably incorporated in a current bridge and adjustable like the welding electrode itself. From the complementary electrode the welding current flows through cables or flexible strips and a slidable intermediate member to a connector bar connected to the next complementary electrode.

The invention will now be described more fully with reference to an embodiment shown by way of example in the accompanying drawings, in which—

FIGS. 1 and 2 are transverse sectional views showing a pair of busbars with the electrode arrangement according to the invention for two different electrode connections.

FIGS. 3, 4 and 5 are an elevation, a top plan view and a side elevation respectively, showing the general arrangement of the electrodes of a multiple spot welding machine according to the invention.

Figure 3:
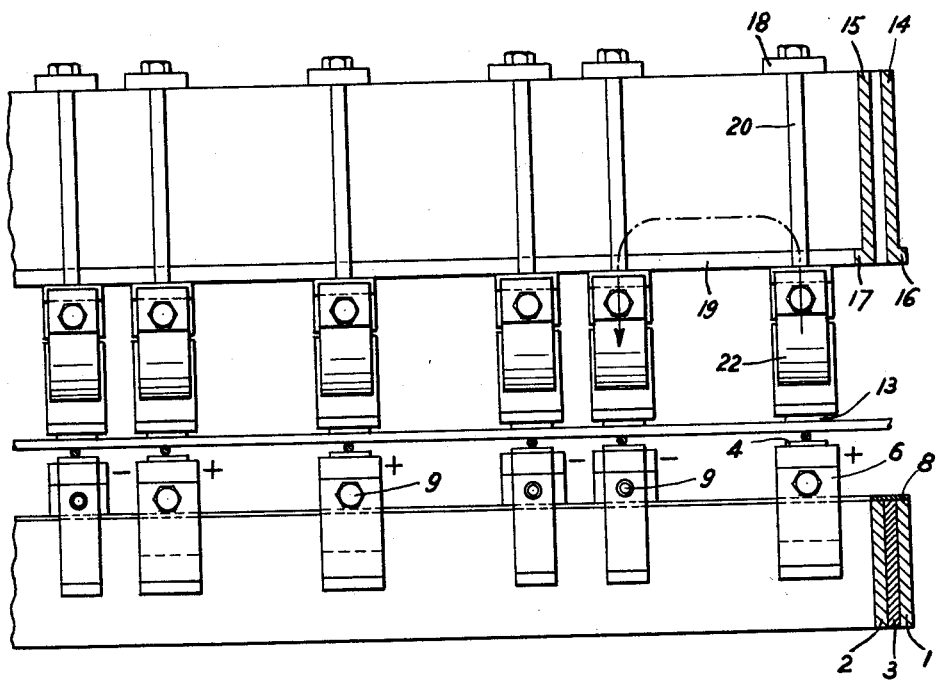

Busbars 1, 2 of a material having a high electrical conductivity are shown in transverse section in FIGS. 1 and 2. These busbars extend in the direction of the series of welding spots and are connected to the two ends of the secondary winding of a welding transformer. An insulating layer 3, which insulates the two busbars from each other, is disposed in the narrow gap between the confronting side faces of the two busbars 1, 2.

For each welding electrode 4, the busbars 1, 2 are provided with a pair of metallic clamping jaws 5, 6. The lower part of one of these jaws (5) is in snug, direct conductive contact with the associated busbar (positive busbar 1 in FIG. 1, negative busbar 2 in FIG. 2) whereas the other jaw is insulated by an intervening insulating interlayer 7 from the busbar engaged by it. A contact between the clamping jaws 5, 6 and the top faces of the busbars is prevented by an insulating covering 8 on the busbars.

In FIG. 1 the welding electrode 4 is integral with the clamping jaw 5, which for this reason is made from socalled electrode material. In the embodiment shown in FIG. 2, the upper portion of the clamping jaw is formed with a recess for receiving the welding electrode 4. This recess is open towards the clamping jaw 6 so that this jaw can engage the free peripheral surface of the welding electrode.

The clamping jaws 5, 6 embrace the busbars 1, 2, like a vice and can be clamped fast on the busbars in any desired position by means of clamping screws 9 to hold the welding electrode 4 in position. The busbars serve to guide the entire electrode unit (pair of clamping jaws and electrode) during an adjusting movement.

FIG. 1 shows an electrode connected to the positive busbar 1. When the clamping screw 9 has been loosened, the entire electrode unit can be turned through 180° to connect the electrode in a simple manner to the negative busbar 2. From the feeding busbar (1 in FIG. 1; 2 in FIG. 2) welding current flows through the clamping jaw 5 contacting said busbar to the electrode 4 and further through the welding spot to a passive complementary electrode which forms together with a second passive complementary electrode a current bridge leading to a second welding spot and back to an active electrode 4 according to FIGS. 1 or 2, which is connected to the second busbar (2 in FIG. 1; 1 in FIG. 2).

The advantages of the design according to the invention are, inter alia, that it permits of a stepless adjustment of the electrode on the busbar in a most simple manner and that any desired number of electrodes can be contacted with the positive or negative busbar. A change in the connection of an electrode, e.g., from the positive busbar to the negative one, can also be effected in a very quick and simple manner. Each electrode can be individually adjusted within the free space between the two neighboring electrodes without need for unclamping the latter.

Because the two busbars directly adjoin the insulating interlayer 3, no foreign matter can be deposited between the two busbars to form contact bridges resulting in short circuits and breakdown. Where the design according to the invention is used, any foreign matter resulting from the welding operation will accumulate on a cover 11, 12, which is insulated from the busbars 1, 2 and extends slightly below the clamping jaws 5, 6 throughout the width of the welding machine. With this arrangement, any foreign matter will collect at places which are readily visible and accessible and thus the foreign matter can be removed in a most simple manner. As the active electrodes 4 are displaceable, the associated passive complementary electrode must also be displaceable to permit of double spot welding.

Figure 4:
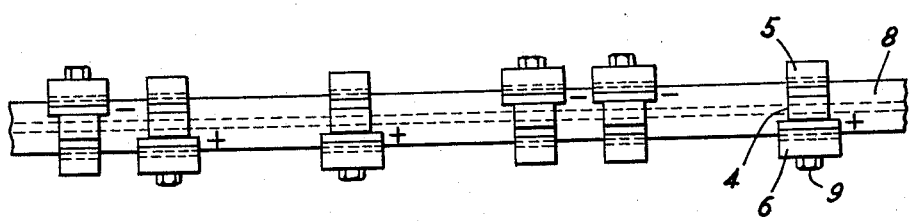

FIGS. 3 to 5 show the general arrangement of the electrodes in accordance with the invention in a welding machine for double spot welding.

An electrode beam for the passive complementary electrodes 13 is disposed over the busbars 1, 2 which carry the above-mentioned active electrodes 4, which can be adjusted as desired. This electrode beam comprises two carrying elements 14, 15 standing on edge and forming a bridge. These elements 14, 15 must take up the electrode pressure. One or more (in the illustrated example two) connector bars 16, 17 of highly conductive material extend throughout the width of the machine, i.e., throughout the length of the electrode beam, on that portion of this carrying structure which faces the active electrodes 4. These connector bars 16, 17 and the carrying elements 14, 15 are held together at spaced points by embracing frames, each of which consists of a cross-member 18, an opposite cross-member 19, and connecting elements 20, 21 preferably in the form of screws. Each cross-member 19 consists of material of high electrical conductivity and is in close contact with the connector bars 16, 17. It is also conductively connected by short lengths of a flexible cable or by short strips 22 of material of high conductivity to a complementary electrode 13. The electrode pressure applied by a spring 23 (or by compressed air or a hydraulic cylinder) is taken up by the upper cross-member 18 and can be freely selected by varying the initial stress.

This arrangement enables a stepless, free adjustment of the complementary electrode 13 too. For this purpose it is sufficient to loosen the connecting elements 20, 21 of the electrode holder, whereafter the cross-member 18, 19 and the complementary electrodes 13 connected thereto as well as the connecting elements 20, 21 can be displaced on the carrying elements 14, 15 and the connector bars 16, 17. The complementary electrodes can be clamped fast in a desired position simply by tightening the connecting elements 20, 21. This device enables the adjustment of each complementary electrode to any desired position in exact registry with a welding electrode 4.

During the welding operation according to the double spot method the current will flow from one busbar through a welding electrode 4 to a complementary electrode 13 and further through a flexible conductor 22 to the cross-member 19 and from there through the connector bars 16, 17 to the next complementary electrode 13 and finally from the latter to another electrode 4 of opposite polarity in a direction opposite to the direction of current flow between the first-mentioned electrode 4 and the counterelectrode 13 associated with it.

For a quick and easy assembly and disassembly of the welding electrode 4 and the complementary electrode 13, it has been found suitable to arrange the entire electrode beam so that it can be pivotally moved upwardly about a longitudinal axis. For this purpose the electrode beam is provided at both ends with pins 24, about which it can be pivotally moved upwardly. When the electrode beam has been raised, the fitting and removal of the electrodes will not be obstructed by any other part of the machine. The pivoted arrangement of the electrode beam will not only permit of an easy fitting of the electrodes but also of an improved and more frequent check of the operative condition of the electrodes.

In order to secure a correct approach and removal of the upper electrode 13 to and from the stationary fixed lower electrode 4, the upper electrode assembly is mounted on supporting plates 25, to which parallel levers 26, 27 are linked. The said levers are pivotally mounted on stationary fixed pins 28, 29, respectively and are operable by a driving device (not shown) in the directions indicated by the double arrow m.

What is claimed is:

1. A welding electrode assembly which comprises two busbars extending parallel one beside the other and electrically insulated from each other, said two busbars defining a gap between them, an insulating interlayer filling said gap, a plurality of pairs of clamping jaws, each of which pairs is releasably clamped to both said busbars and electrically insulated from one of said busbars and comprises a jaw in electrically insulated engagement with said one busbar and another jaw in electrically conductive contact with the other busbar of said pair, different pairs of said clamping jaws being electrically insulated from different ones of said busbars, and a plurality of welding electrodes, each of which is carried by one of said pairs of clamping jaws, each said pairs of clamping jaws being adapted to be clamped to said busbars in different positions.

2. A welding electrode assembly as set forth in claim 1, in which each of said pairs of clamping jaws embraces said busbars like a vice.

3. A welding electrode assembly as set forth in claim 1, in which each of said welding electrodes is integral with one of said clamping jaws.

4. A welding electrode assembly as set forth in claim 1, in which each of said electrodes is inserted between the clamping jaws of the pair of clamping jaws carrying said electrode.

5. A welding electrode assembly as set forth in claim 4, in which one of said clamping jaws of each pair thereof is formed with a recess which is open towards the other jaw of said pair and the electrode is received in said recess.

6. A welding electrode assembly as set forth in claim 1, in which each of said pairs of clamping jaws has a clamping screw associated with it for forcing said clamping jaws firmly against said busbars.

7. A welding electrode assembly as set forth in claim 1, which comprises connector bars spaced from and extending parallel to said busbars, and a plurality of complementary electrodes, each of which is associated with one of said welding electrodes and slidably mounted on said connector bars.

8. A welding electrode assembly as set forth in claim 7, which comprises a plurality of electrode holders slidably movable along said connector bars, each of said complementary electrodes being carried by one of said electrode holders with freedom of movement towards and away from said busbars, and electrically conductive, flexible means connecting each of said complementary electrodes to the respective electrode holder.

9. A welding electrode assembly as set forth in claim 8, in which said flexible means comprise a cable.

10. A welding electrode assembly as set forth in claim 8, in which said flexible means comprise a strip.

11. A welding electrode assembly as set forth in claim 8, which comprises an electrode beam including said connector bars and means for releasably locking said electrode holders to said electrode beam in selected positions.

12. A welding electrode assembly as set forth in claim 11, in which said electrode beam is mounted to be pivotally movable about an axis parallel to said connector bars.

References Cited in the file of this patent

UNITED STATES PATENTS

| | | |
|---|---|---|
| 2,469,897 | Schilling et al. | May 10, 1949 |
| 2,588,062 | Vorderstrasse | Mar. 4, 1952 |